US010196991B2

(12) United States Patent
Quix et al.

(10) Patent No.: US 10,196,991 B2
(45) Date of Patent: Feb. 5, 2019

(54) MULTI-CYLINDER OTTO-CYCLE ENGINE AND METHOD FOR OPERATING THE SAME

(71) Applicant: Ford Global Technologies, LLC, Dearborn, MI (US)

(72) Inventors: Hans Guenter Quix, Herzogenrath (DE); Maziar Khosravi, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 14/987,389

(22) Filed: Jan. 4, 2016

(65) Prior Publication Data
US 2016/0201583 A1 Jul. 14, 2016

(30) Foreign Application Priority Data
Jan. 8, 2015 (DE) .................. 10 2015 200 150

(51) Int. Cl.
*F02D 41/00* (2006.01)
*F02B 75/12* (2006.01)
(Continued)

(52) U.S. Cl.
CPC ............ *F02D 41/0002* (2013.01); *F01L 7/02* (2013.01); *F01L 13/00* (2013.01); *F02B 23/08* (2013.01); *F02B 75/12* (2013.01); *F02D 13/0276* (2013.01); *F02P 13/00* (2013.01); F01L 2013/001 (2013.01); F02D 17/02 (2013.01); F02D 2041/0012 (2013.01); F02P 15/00 (2013.01); H01T 13/00 (2013.01);
(Continued)

(58) Field of Classification Search
CPC ......... F02D 41/0002; F02D 2041/0012; F02B 75/12; F02P 13/00
See application file for complete search history.

(56) References Cited

U.S. PATENT DOCUMENTS 1,620,832 A * 3/1927 Porter ................ F01L 7/022
123/190.17
6,240,888 B1 6/2001 Pilney
(Continued)

FOREIGN PATENT DOCUMENTS

DE 102006028281 A1 12/2007
DE 102011118470 A1 5/2012

*Primary Examiner* — Jacob Amick
*Assistant Examiner* — Charles Brauch
(74) *Attorney, Agent, or Firm* — Julia Voutyras; McCoy Russell LLP

(57) ABSTRACT

The disclosure relates to an engine having a cylinder head which is divided into multiple sections which each delimit a combustion chamber of a cylinder of the engine and which each comprise inlet and outlet ducts, inlet and outlet valves, and a spark device which is fastened in a through hole of the cylinder head section, for at least one cylinder head section a throttle flap being provided for completely closing the corresponding inlet duct in the event of a deactivation of the associated cylinder. In the at least one cylinder head section, a first gas flow duct is formed between the through hole and the outlet duct, and the spark device is in the form of a rotary slide valve with integrated spark electrodes and is configured to selectively either keep the first gas flow duct closed or connect said first gas flow duct to the associated combustion chamber.

7 Claims, 4 Drawing Sheets

(51) Int. Cl.
*F01L 7/02* (2006.01)
*F01L 13/00* (2006.01)
*F02P 13/00* (2006.01)
*F02B 23/08* (2006.01)
*F02D 13/02* (2006.01)
F02D 17/02 (2006.01)
F02P 15/00 (2006.01)
H01T 13/00 (2006.01)
H01T 13/08 (2006.01)
H01T 13/40 (2006.01)

(52) U.S. Cl.
CPC .............. *H01T 13/08* (2013.01); *H01T 13/40* (2013.01); *Y02T 10/125* (2013.01); *Y02T 10/18* (2013.01); *Y02T 10/42* (2013.01)

(56) References Cited

U.S. PATENT DOCUMENTS

| | | | |
|---|---|---|---|
| 7,073,471 B1 | 7/2006 | Mead | |
| 2008/0029058 A1* | 2/2008 | Duesmann | F02D 9/00 123/198 F |
| 2008/0098977 A1 | 5/2008 | Yamashita et al. | |
| 2008/0257300 A1* | 10/2008 | Lyon | F02D 13/06 123/198 F |
| 2010/0319655 A1* | 12/2010 | McClendon | F02B 19/08 123/279 |
| 2012/0118265 A1 | 5/2012 | Keating | |

* cited by examiner

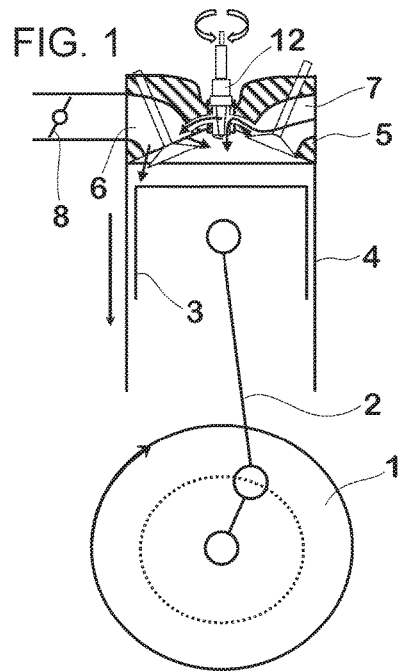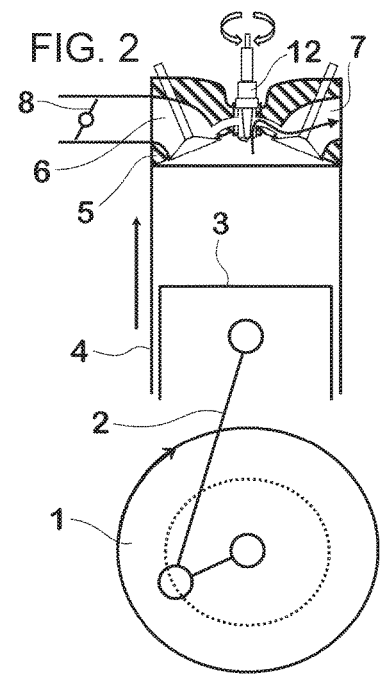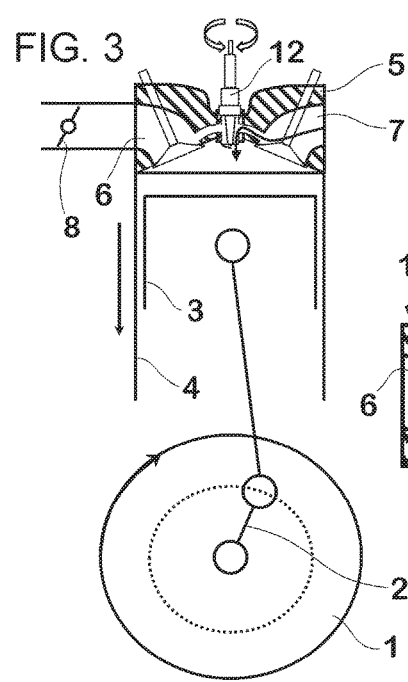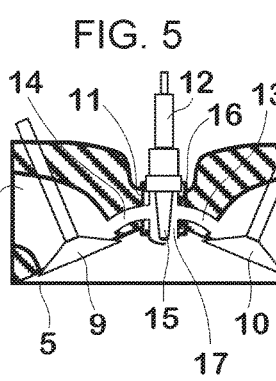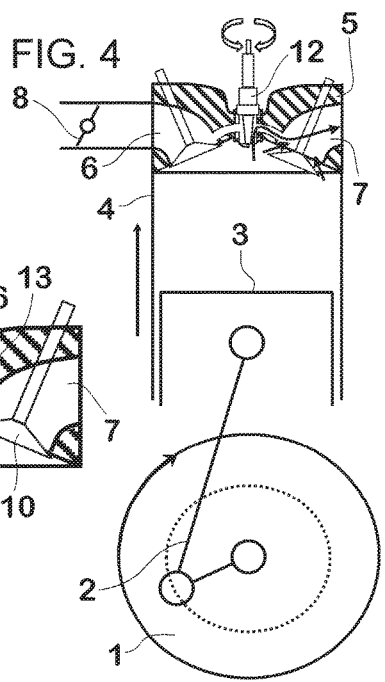

MULTI-CYLINDER OTTO-CYCLE ENGINE AND METHOD FOR OPERATING THE SAME

CROSS REFERENCE TO RELATED APPLICATION

The present application claims priority to German Patent Application No. 102015200150.4, filed Jan. 8, 2015, the entire contents of which are hereby incorporated by reference for all purposes.

FIELD

The invention relates to a multi-cylinder Otto-cycle engine, and to methods for operating the same.

BACKGROUND AND SUMMARY

Selective cylinder deactivation, in which one or more cylinders of an engine are deactivated, may reduce fuel consumption during certain operating conditions, such as low engine loads. To maintain stoichiometric operation necessary for optimum operation of the three way catalyst during cylinder deactivation (e.g., to prevent flow of uncombusted intake air to the catalyst via a deactivated cylinder), engines configured to operate with cylinder deactivation may have variable valve lift systems to allow the intake valves and exhaust valves of deactivated cylinders to remain closed while the intake valves and exhaust valves of activated cylinders continue to open and close. However, such deactivatable drive systems may be costly and increase the packaging space of the engine.

DE 10 2011 118 470 A1 has disclosed a multi-cylinder Otto-cycle engine, in which individual cylinders can be deactivated during operation. By contrast to conventional cylinder deactivation, in the case of which all of the valves of each deactivated cylinder are deactivated in order to avoid gas exchange losses, it is the case here that only the inlet valves can be deactivated, and the throttle flap for closing the inlet duct is closed and opened with a time offset in relation to a valve deactivation or reactivation in order to ensure that a transition between operation without cylinder deactivation and with cylinder deactivation is less perceptible to the driver.

The inventors herein have recognized a few issues with the above approach. In the case of said engine of the reference, considerable gas exchange losses arise during cylinder deactivation operation. Further, cumbersome deactivatable valve drives are still required.

Accordingly, an engine is provided herein to at least partly address the above issues. In one example, a multi-cylinder Otto-cycle engine comprises a cylinder head which is divided into multiple sections which each delimit a combustion chamber of a cylinder of the Otto-cycle engine and which each comprise inlet and outlet ducts, inlet and outlet valves and an ignition spark generating device which is fastened in a through hole of the cylinder head section, a throttle flap being provided for at least one cylinder head section for completely closing the corresponding inlet duct in the event of a deactivation of the associated cylinder, a first gas flow duct in the at least one cylinder head section formed between the through hole and the outlet duct, and the ignition spark generating device is in the form of a rotary slide valve with integrated ignition spark electrodes, said rotary slide valve being configured to selectively either keep the first gas flow duct closed or connect said first gas flow duct to the associated combustion chamber.

In this way, cylinder deactivation may be performed entirely without valve deactivation with decreased gas exchange losses, reduced use of structural space, and reduced cost. The region around the ignition plug provides short gas flow ducts for a gas exchange reduced losses, and the ignition plug also performs the function of a gas exchange valve. In this way, the space for the inlet and outlet valves and possibly an injection nozzle is minimally affected, and it is possible to retain existing cylinder head designs with only minor modifications.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows a cross section through a deactivated cylinder of a multi-cylinder Otto-cycle engine during an intake stroke.

FIG. 2 shows the cross section of FIG. 1 during a compression stroke.

FIG. 3 shows the cross section of FIG. 1 during a working stroke.

FIG. 4 shows the cross section of FIG. 1 during an exhaust stroke.

FIG. 5 shows an enlarged cross-sectional view of only the cylinder head in FIGS. 1-4.

DETAILED DESCRIPTION

Figure 6:
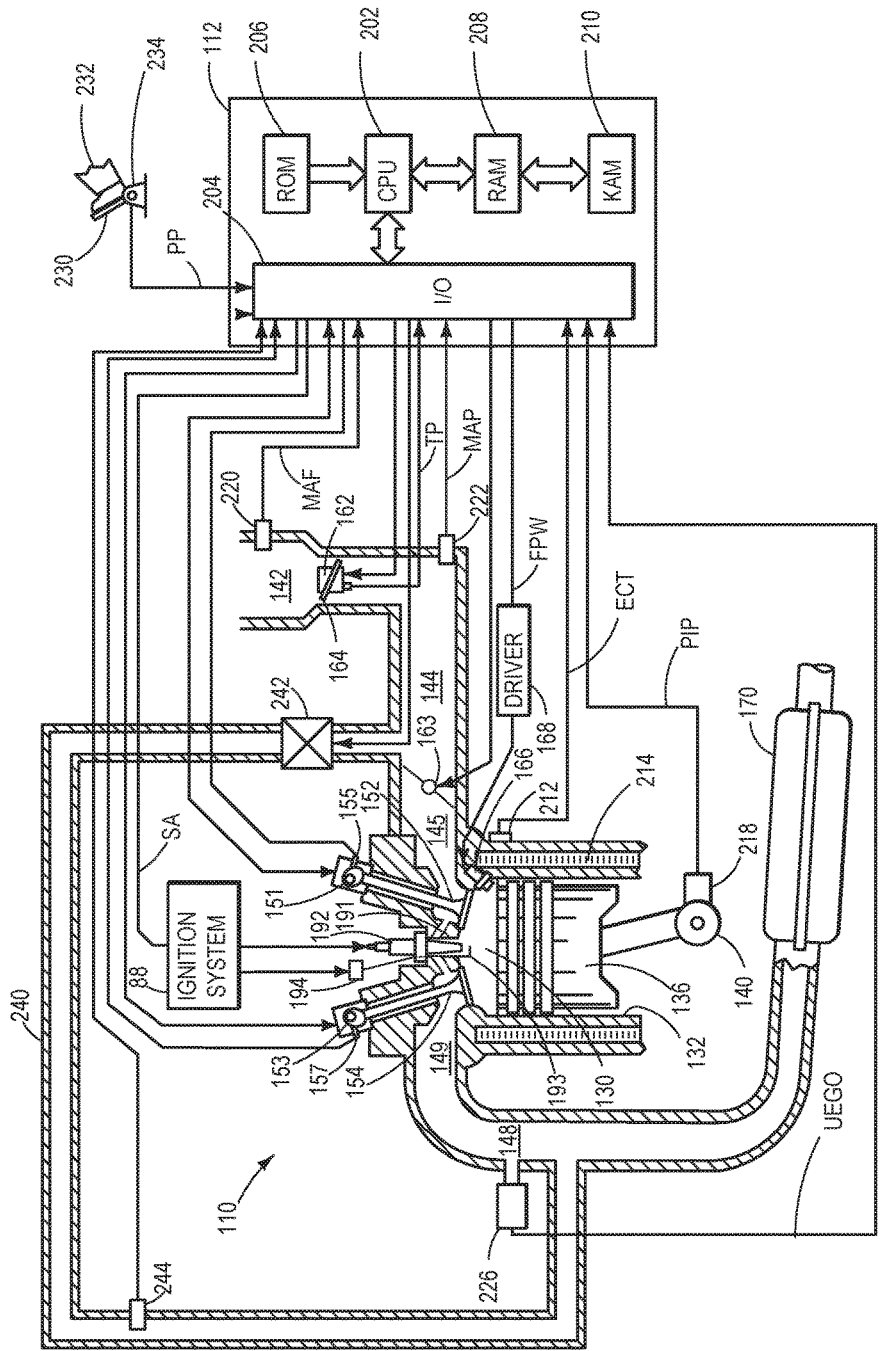
FIG. 6 shows a schematic diagram of a combustion chamber of an internal combustion engine.

Cylinder deactivation may reduce fuel consumption by providing for operation of a subset of cylinders of an engine at higher efficiency during conditions that would otherwise result in lower-efficiency operation, such as during low engine load conditions. During cylinder deactivation, one or more cylinders of the engine are operated without fuel injection, and fuel injection amounts to the activated cylinders are increased to maintain torque. To reduce gas exchange losses without requiring deactivatable intake and exhaust valves, each deactivatable cylinder may be provided with an intake duct throttle valve controllable to fully close off the intake duct and hence prevent intake air from being drawn into the corresponding deactivatable cylinder. A gas flow duct is present in the cylinder head, fluidically coupling the intake duct (downstream of the throttle valve), exhaust duct, and combustion chamber via a through hole in which an ignition plug is inserted. A rotatable sleeve is positioned in the through hole and configured to house the ignition plug electrode. The rotatable sleeve includes one or more ports that when aligned with the gas flow duct allow for gas to travel between the combustion chamber, intake duct, and/or exhaust duct.

During normal engine operation, the rotatable sleeve may be in a default position wherein the gas flow duct is not fluidically coupled to the combustion chamber (e.g., the fluidic coupling of the gas flow duct to both the intake duct and the exhaust duct are blocked). During cylinder deactivation, the rotatable sleeve is rotated to align the ports of the sleeve with the gas flow duct, thus allowing fluid communication between the intake duct, exhaust duct, and combustion chamber, even when the intake and exhaust valves are closed. In doing so, the intake valve and exhaust valve of the deactivatable cylinder may be operated during cylinder deactivation, thus eliminating or minimizing the cost, complexity, and packaging space associated with deactivatable valve drive systems. Further, intake air may be prevented from being drawn into the deactivated cylinder while gas exchange still occurs between the combustion chamber and exhaust duct, even if the exhaust valve is closed, thus reducing gas exchange losses and improving the efficiency of the engine during cylinder deactivation.

The gas flow ducts and the modified ignition plug for the gas exchange may be provided for only one cylinder or for each of several cylinders, or for all of the cylinders, of an engine, depending on how many cylinders are intended to be deactivatable during operation or whether said cylinders are intended to be alternately deactivatable.

In one example, each deactivatable cylinder comprises only one gas exchange flow duct, which extends between the through hole and the outlet (exhaust) duct and which can be connected by way of the ignition spark generating device to the combustion chamber. In this case, when the cylinder is deactivated, the gas exchange is performed, during every stroke, via said gas flow duct and, during the discharge stroke, additionally via the outlet valve which is then open.

In another example, each deactivatable cylinder comprises a further gas exchange flow duct, which extends between the through hole and the inlet duct and which can be connected by way of the ignition spark generating device to the combustion chamber. In this case, during the intake stroke, the gas exchange can take place additionally via the open inlet valve and the further duct, as the two ducts are connected to one another by way of the ignition spark generating device when the cylinder is deactivated.

The ignition spark generating device may be in the form of a rotary slide valve with integrated ignition spark electrodes. The rotary slide valve may have an insulated central electrode and a tubular sleeve which surrounds the central electrode with a ring-shaped intermediate space and which is arranged in the through hole, similarly to a conventional ignition plug. The sleeve is rotatable in the through hole without axial displacement, that is to say does not move in the manner of a conventional ignition plug during the screwing-in process. The tubular sleeve may comprise, on its circumference, one or two holes which, depending on the rotational position of the rotary slide valve, are aligned or not aligned with the first gas flow duct and possibly the second gas flow duct, in the aligned state the ring-shaped intermediate space connecting the first and possibly the second gas flow duct to the associated combustion chamber and possibly also to one another. In the shut-off state of the rotary slide valve, that is to say during the normal operation of the associated cylinder, the rotary slide valve is gas-tight, in particular in the direction of the combustion chamber.

As mentioned, in the case of the Otto-cycle engine according to the disclosure, fuelsaving and emissions-reducing cylinder deactivation is possible entirely without valve deactivation, such that use can be made of a simple conventional, permanently active positive valve drive.

During the operation of the Otto-cycle engine according to the disclosure, for the deactivation of a cylinder, the associated throttle flap in the inlet is closed, and all of the associated inlet and outlet valves continue to be actuated, and the ignition spark generating device of the deactivated cylinder is actuated to connect the first gas flow duct to the associated combustion chamber, and in the refinement mentioned above, the ignition spark generating device is actuated also to connect the second gas flow duct to the associated combustion chamber and to connect the two gas flow ducts to one another.

For the deactivation and reactivation of a cylinder, the rotary slide valve is rotated back and forth about its longitudinal axis in the through hole, for example via an actuator which engages, for example, on a suitably shaped section of the ignition spark generating device which protrudes from the cylinder head on the side averted from the combustion chamber. It would be possible, in principle, for the actuator to engage on an outwardly projecting insulator, similar to that of conventional ignition plugs, in order to rotate the rotary slide valve, but in practice, an arrangement will be provided in which the actuator engages at a lower point, in particular on the tubular sleeve, and/or said actuator will be integrated into the ignition spark generating device.

The angle of rotation of the rotary slide valve may amount to for example 90 degrees or less, and must be at least great enough that the gas flow ducts are in each case completely closed and opened.

FIGS. 1-4 schematically show a crankshaft 1, a connecting rod 2, a piston 3, a cylinder wall 4 and an associated cylinder head section 5 of a multi-cylinder Otto-cycle engine. The direction of rotation of the crankshaft 1 and the direction of movement of the piston 3 are each denoted by arrows.

The cylinder head section 5 comprises an inlet duct 6 and an outlet duct 7. The cylinder which is shown has been deactivated by virtue of its inlet being closed off in substantially gastight fashion by way of a throttle flap 8 and by virtue of an injection nozzle (not shown), if present, injecting no fuel.

With reference also to FIG. 5, the cylinder head section 5 also comprises an inlet valve 9 and an outlet valve 10, which cannot be deactivated, such that, when the engine is running, while the cylinder which is shown is deactivated, the inlet and outlet valves 9, 10 assume the positions shown in FIGS. 1-4.

With reference in particular to FIG. 5, the cylinder head section 5 furthermore comprises a through hole 11 which extends from the combustion chamber, which is delimited by the piston 3, the cylinder wall 4 and the cylinder head section 5, to the opposite side of the cylinder head section 5, in which through hole there is fastened an ignition spark generating device 12 which has dimensions similar to those of a conventional ignition plug and which differs therefrom in the manner discussed in more detail further below.

With reference to FIG. 5, the cylinder head section 5 furthermore comprises a first gas flow duct 13, which provides a flow connection between the outlet duct 7 and the through hole 11, and a second gas flow duct 14, which provides a flow connection between the inlet duct 6 and the through hole 11.

The ignition spark generating device 12 is designed to selectively either keep the two gas flow ducts 13, 14 closed or connect said gas flow ducts to one another and to the combustion chamber. For this purpose, the ignition spark generating device 12 is in the form of a rotary slide valve with integrated ignition spark electrodes, which rotary slide valve has an insulated central electrode 15 and a tubular sleeve 16 which surrounds the central electrode 15 with a ring-shaped intermediate space 17 and which bears a ground electrode which interacts with the central electrode 15.

The sleeve 16 extends substantially over the length of the through hole 11 and is rotatable back and forth therein without axial displacement, as indicated in FIGS. 1-4 by two curved arrows above the ignition spark generating device 12. The sleeve 16 comprises, on its circumference, two mutually opposite holes which, in the rotational position shown, are each aligned with one of the gas flow ducts 13 and 14. In another rotational position, in which it has for example been rotated through 90 degrees about its longitudinal axis, the sleeve 16 closes the gas flow ducts 13 and 14 (illustrated in FIG. 6). The rotation is effected by an actuator (shown in FIG. 6) which acts on the ignition spark generating device 12 or on the sleeve 16.

As indicated in FIG. 1 by flow arrows, during an intake stroke, the piston 3 draws gas from the outlet duct 7 through the first gas flow duct 13 into the intermediate space 17 between the central electrode 15 and the tubular sleeve 16, with part of said gas then being drawn into the combustion chamber directly, and another part being drawn into the combustion chamber through the second gas flow duct 14 and the inlet valve 9, which is then open.

As indicated in FIG. 2 by flow arrows, during a compression stroke, the piston 3 forces gas out of the combustion chamber into the outlet duct 7 through the intermediate space 17 and through the first gas flow duct 13.

As indicated in FIG. 3 by flow arrows, during a working stroke, the piston 3 draws gas from the outlet duct 7 into the combustion chamber through the first gas flow duct 13 and via the intermediate space 17.

As indicated in FIG. 4 by flow arrows, during an exhaust stroke, the piston 3 forces gas out of the combustion chamber, a part of said gas being forced into the outlet duct 7 directly through the outlet valve 10 which is then open, and another part of said gas being forced into the outlet duct 7 through the intermediate space 17 and through the first gas flow duct 13.

FIG. 6 displays a schematic diagram showing one cylinder of multi-cylinder engine 110, which may be included in a propulsion system of a vehicle. Engine 110 may be controlled at least partially by a control system including controller 112 and by input from a vehicle operator 232 via an input device 230. In this example, input device 230 includes an accelerator pedal and a pedal position sensor 234 for generating a proportional pedal position signal PP. Combustion chamber (i.e., cylinder) 130 of engine 110 may include combustion chamber walls 132 with piston 136 positioned therein. Piston 136 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 110. Cylinder 130 and associated componentry may be one non-limiting example of cylinder head section 5 of FIGS. 1-5 and thus includes a gas flow duct 191, a throttle flap 163, and turnable sleeve 193, which will be explained in more detail below.

Combustion chamber 130 may receive intake air from an intake duct 145 via intake manifold 144 and intake passage 142 and may exhaust combustion gases via exhaust duct 149 coupled to exhaust passage 148. Intake duct 145 and exhaust duct 149 may selectively communicate with combustion chamber 130 via respective intake valve 152 and exhaust valve 154. In some embodiments, combustion chamber 130 may include one or more intake valves and one or more exhaust valves.

In this example, intake valve 152 and exhaust valves 154 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 112 to vary valve operation. The position of intake valve 152 and exhaust valve 154 may be determined by position sensors 155 and 157, respectively. In alternative embodiments, intake valve 152 and/or exhaust valve 154 may be controlled by electric valve actuation. For example, cylinder 130 may alternatively include an intake valve controlled via electric valve actuation and an exhaust valve controlled via cam actuation including CPS and/or VCT systems. However, as described above, in some examples cylinder 130 may not include any mechanisms to provide variable valve actuation.

Fuel injector 166 is shown coupled directly to combustion chamber 130 for injecting fuel directly therein in proportion to the pulse width of signal FPW received from controller 112 via electronic driver 168. In this manner, fuel injector 166 provides what is known as direct injection of fuel into combustion chamber 130. The fuel injector may be mounted in the side of the combustion chamber or in the top of the combustion chamber, for example. Fuel may be delivered to fuel injector 166 by a fuel system (not shown) including a fuel tank, a fuel pump, and a fuel rail. In some embodiments, combustion chamber 130 may alternatively or additionally include a fuel injector arranged in intake passage 142 in a configuration that provides what is known as port injection of fuel into the intake port upstream of combustion chamber 130.

Intake passage 142 may include a throttle 162 having a throttle plate 164. In this particular example, the position of throttle plate 164 may be varied by controller 112 via a signal provided to an electric motor or actuator included with throttle 162, a configuration that is commonly referred to as electronic throttle control (ETC). In this manner, throttle 162 may be operated to vary the intake air provided to combustion chamber 130 among other engine cylinders. The position of throttle plate 164 may be provided to controller 112 by throttle position signal TP. Intake passage 142 may include a mass air flow sensor 220 and a manifold air pressure sensor 222 for providing respective signals MAF and MAP to controller 112. An additional throttle flap 163 is provided in the intake duct 145 upstream of the intake valve 152. Throttle flap 163 may be maintained open during standard engine operation (e.g., when cylinder 130 is activated) and may be fully closed during cylinder deactivation.

Ignition system 188 may provide an ignition spark to combustion chamber 130 via spark plug 192 in response to spark advance signal SA from controller 112, under select operating modes. Though spark ignition components are shown, in some embodiments, combustion chamber 130 or one or more other combustion chambers of engine 110 may be operated in a compression ignition mode, with or without an ignition spark.

Spark plug 192 may be housed in a through hole of the cylinder head in which turnable sleeve 193 is positioned. The through hole is fluidically coupled to a gas flow duct 191 that includes a first segment coupled to the intake duct 145 and a second segment coupled to the exhaust duct 149. During normal operation of the cylinder, turnable sleeve 193 may be in a first position wherein spark plug 192 is open to the combustion chamber but fluidic coupling between the spark plug 192 and intake duct 145 and exhaust duct 149 via gas flow duct 191 is blocked (as shown in FIG. 6). As described above with respect to FIGS. 1-5, the turnable sleeve 193 may be rotated by an actuator 194 responsive to cylinder 130 being deactivated. In the rotated position, fluidic coupling between the spark plug 192, combustion chamber 130, intake duct 145, and exhaust duct 149 is provided via the gas flow duct 191, as explained above.

Exhaust gas sensor 226 is shown coupled to exhaust passage 148 upstream of emission control device 170. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 170 is shown arranged along exhaust passage 148 downstream of exhaust gas sensor 226. Device 170 may be a three way catalyst (TWC), NOx trap, various other emission control devices, or combinations thereof. In some embodiments, during operation of engine 110, emission control device 170 may be periodically reset by operating at least one cylinder of the engine within a particular air/fuel ratio.

Further, in the disclosed embodiments, an exhaust gas recirculation (EGR) system may route a desired portion of exhaust gas from exhaust passage 148 to intake manifold 144 via EGR passage 240. The amount of EGR provided to intake manifold 144 may be varied by controller 112 via EGR valve 242. Further, an EGR sensor 244 may be arranged within the EGR passage and may provide an indication of one or more pressure, temperature, and concentration of the exhaust gas. In some examples, sensor 244 is a differential pressure transducer detecting pressure drop across a flow control orifice placed either upstream or downstream of the EGR valve which will also provide an indication of the amount of EGR. Sensor 244 also may also be a position sensor which can detect EGR valve flow area changes based upon commands from controller 112. Further, during some conditions, a portion of combustion gases may be retained or trapped in the combustion chamber by controlling exhaust valve timing, such as by controlling a variable valve timing mechanism.

Controller 112 is shown in FIG. 6 as a microcomputer, including microprocessor unit 202, input/output ports 204, an electronic storage medium for executable programs and calibration values shown as read-only memory chip 206 in this particular example, random access memory 208, keep alive memory 210, and a data bus. Controller 112 may receive various signals from sensors coupled to engine 110, in addition to those signals previously discussed, including measurement of inducted mass air flow (MAF) from mass air flow sensor 220; engine coolant temperature (ECT) from temperature sensor 212 coupled to cooling sleeve 214; a profile ignition pickup signal (PIP) from Hall effect sensor 218 (or other type) coupled to crankshaft 40; throttle position (TP) from a throttle position sensor; and absolute manifold pressure signal, MAP, from sensor 122. Engine speed signal, RPM, may be generated by controller 112 from signal PIP. Manifold pressure signal MAP from a manifold pressure sensor may be used to provide an indication of vacuum, or pressure, in the intake manifold. Note that various combinations of the above sensors may be used, such as a MAP sensor without a MAF sensor.

During stoichiometric operation, the MAP sensor can give an indication of engine torque. Further, this sensor, along with the detected engine speed, may provide an estimate of charge (including air) inducted into the cylinder. In one example, sensor 218, which is also used as an engine speed sensor, may produce a predetermined number of equally spaced pulses every revolution of the crankshaft.

Figure 7:
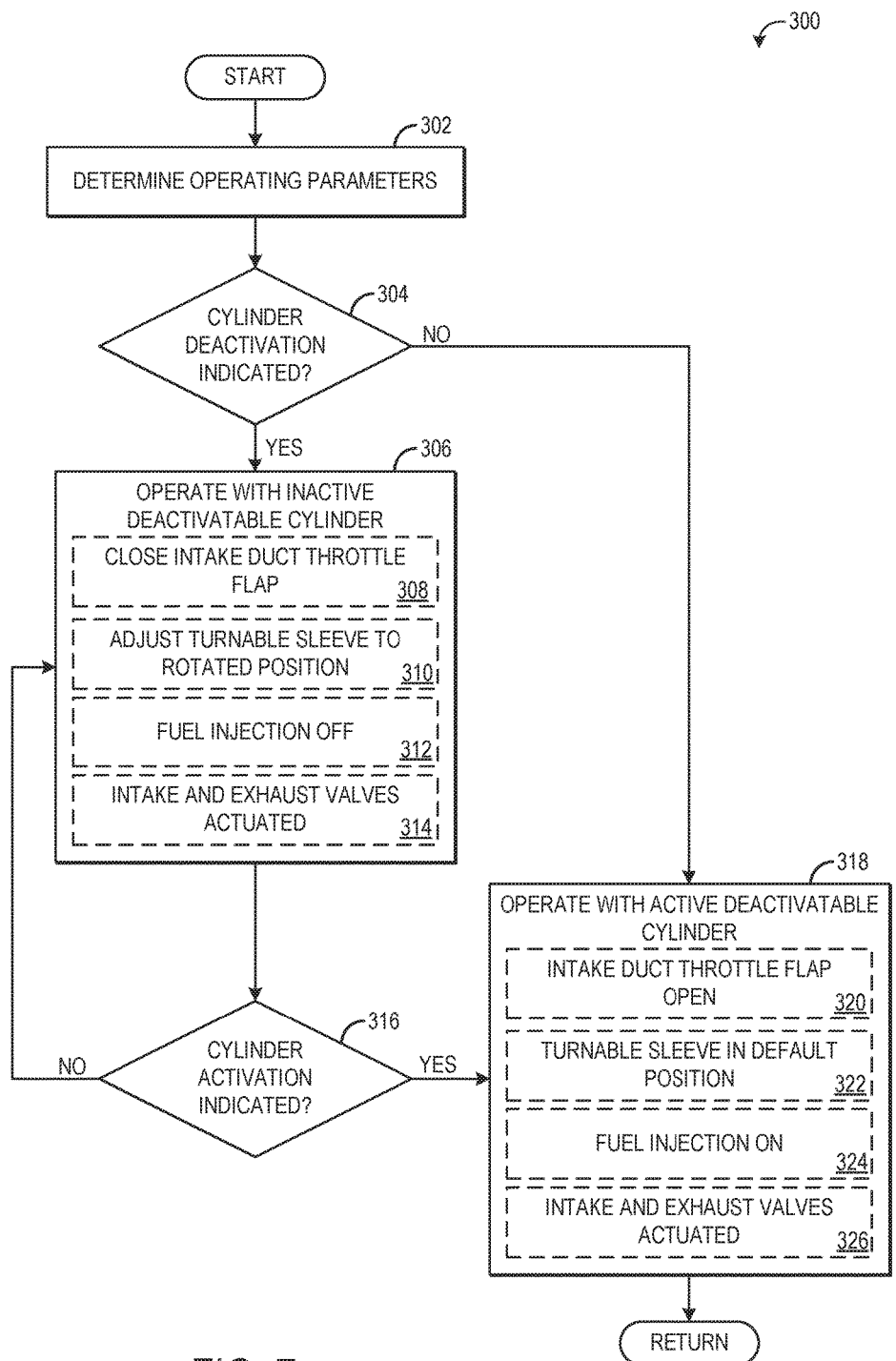
FIG. 7 is a flow chart illustrating a method for operating an engine including a deactivatable cylinder.

Storage medium read-only memory 206 may be programmed with computer readable data representing instructions executable by processor 202 for performing the method described below in FIG. 7 as well as other variants that are anticipated but not specifically listed. The controller 112 receives signals from the various sensors of FIG. 6 (such as MAP sensor 222, MAP sensor 220, and Hall effect sensor 218) and employs the various actuators (such as throttle flap 163, actuator 194, and fuel injector 166) of FIG. 6 to adjust engine operation based on the received signals and instructions stored on a memory of the controller.

As described above, FIG. 6 shows one cylinder of a multi-cylinder engine, and each cylinder may similarly include its own set of intake/exhaust valves, fuel injector, spark plug, etc. Further, the above-described aspects of the engine system are non-limiting, and other configurations are possible. For example, the system may not have exhaust air recirculation. In other examples, the system may further comprise a turbocharger supplying compressed air to the intake manifold. Further, additional cylinders of the engine which are not deactivatable may not indude an additional throttle flap, turnable sleeve, or gas flow duct.

During the operation of a multi-cylinder engine each cylinder undergoes a four-stroke cycle. The cycle includes an air intake stroke during which intake valve 152 is open and exhaust valve 154 is closed. Air is introduced into cylinder 130 via intake manifold 144, and piston 136 moves to the bottom of the cylinder so as to increase the volume within cylinder 130. The position at which piston 136 is near the bottom of the cylinder and at the end of its stroke (e.g., when cylinder 130 is at its largest volume) is typically referred to by those of skill in the art as bottom dead center (BDC). This is followed by a compression stroke, when both intake valve 152 and exhaust valve 154 are closed, and piston 136 moves toward the cylinder head so as to compress the air within cylinder 130. The point at which piston 136 is at the end of its stroke and closest to the cylinder head (e.g., when cylinder 130 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 192, resulting in combustion. Additionally or alternatively compression may be used to ignite the air/fuel mixture. At the end of the compression stroke, the crankshaft has finished one full rotation in connection to this individual cylinder, i.e., it has traveled 360 degrees.

During the expansion (power) stroke that follows, the expanding gases energized by the combustion reaction push piston 136 back to BDC. Crankshaft 140 converts piston movement into a rotational torque of the rotary shaft. During this stroke valves 152 and 154 remain closed. The final stroke of the cycle is the exhaust stroke, where exhaust valve 154 opens to release the combusted air-fuel mixture to exhaust manifold 148 and the piston returns to TDC. This completes a second 360-degree movement, i.e., the crankshaft has finished a second full rotation in connection to this individual cylinder. Note that the above is described merely as an example, and that intake and exhaust valve opening and/or closing timings may vary, such as to provide positive or negative valve overlap, late intake valve closing, early intake valve closing, or various other examples.

Thus, the deactivatable cylinders described above may be operated with intake and exhaust valve actuation, even during conditions wherein the deactivatable cylinders are deactivated. To prevent flow of intake air to a downstream exhaust catalyst (which may result in compromised emissions), an additional throttle flap in the intake duct may be closed during cylinder deactivation. Further, to prevent gas exchange losses associated with compressing residual intake air and/or exhaust gas in the deactivatable cylinder during cylinder deactivation, a flow path from the intake duct to the exhaust duct via the combustion chamber of the cylinder is provided in the cylinder head. The flow path includes the through hole in which the spark plug is housed. To regulate flow through the flow path, a rotatable or turnable sleeve is housed in the through hole. The sleeve is open to the combustion chamber on one end and is in face-sharing, leak-tight contact with the interior of the through hole. The sleeve includes multiple ports to align with the flow path in the cylinder head during cylinder deactivation, thus allowing flow of gas among the intake duct, exhaust duct, and combustion chamber during cylinder deactivation.

As described above, the sleeve in the through hole and which surrounds the spark plug is movable based on cylinder activation and deactivation. FIG. 7 is a flow chart illustrating a method 300 for controlling gas flow during cylinder deactivation. Instructions for carrying out method 300 may be executed by a controller based on instructions stored on a memory of the controller and in conjunction with signals received from sensors of the engine system, such as the sensors described above with reference to FIG. 6. The controller may employ engine actuators of the engine system to adjust engine operation, according to the methods described below.

At 302, method 300 includes determining operating parameters. The determined operating parameters may include engine speed, engine load, fuel injection amounts, engine temperature, and other operating parameters. At 304, method 300 includes determining if cylinder deactivation is indicated. In one example, cylinder deactivation may be indicated based on engine load, such as cylinder deactivation being indicated when engine load is relatively low, e.g., 25% of maximum rated load or lower. Other parameters that may affect cylinder deactivation include engine temperature (e.g., cylinder deactivation may not occur if engine temperature is below operating temperature), emission control device status (e.g., if a device is undergoing regeneration, cylinder deactivation may not occur), and/or other parameters.

If it is determined that cylinder deactivation is not indicated, method 300 proceeds to 318 to operate with all cylinders active, which will be described in more detail below. If cylinder deactivation is indicated, method 300 proceeds to 306 to operate with at least an inactive deactivatable cylinder. Operating with an inactive deactivatable cylinder includes, as indicated at 308, closing an intake duct throttle flap, such as the throttle flap 8 of FIGS. 1-5 or throttle flap 163 of FIG. 6. Operating with an inactive deactivatable cylinder also includes, as indicated at 310, adjusting a turnable sleeve housing a spark plug to a rotated position, such as the sleeve 16 of FIGS. 1-5 or the sleeve 193 of FIG. 6. In the rotated position, fluidic coupling between a gas flow duct (e.g., gas flow ducts 13 and 14 of FIGS. 1-5 or gas flow duct 191 of FIG. 6), the combustion chamber of the deactivatable cylinder, and one or more of the exhaust duct and intake duct coupled to the deactivatable cylinder are established.

Operating with an inactive deactivatable cylinder further includes turning off fuel injection to the deactivatable cylinder, as indicated at 312. Further, during operation with an inactive deactivatable cylinder, intake and exhaust valves of the deactivatable cylinder are actuated, as indicated at 314. Further, during cylinder deactivation, one or more cylinders of the engine, which may or may not be deactivatable, are operated with fuel injection on, intake and exhaust valve actuation, and spark active in order to carry out combustion in those cylinders. The deactivatable cylinder may suspend spark during the duration of the deactivation, or spark may be carried out (without ignition due to the lack of oxygen and fuel in the cylinder).

At 316, method 300 includes determining if cylinder activation is indicated. Cylinder activation following deactivation may be indicated when engine load increases above the threshold or based on other parameters. If cylinder activation is not indicated, method 300 loops back to 306 to continue to operate with an inactive deactivatable cylinder. If cylinder activation is indicated, method 300 proceeds to 318 to operate with an active deactivatable cylinder. This includes, at 320, opening or maintaining open the intake duct throttle flap, adjusting or maintaining the turnable sleeve to or at the default position, as indicated at 322, turning on or maintaining on fuel injection at 324, and actuating the intake and exhaust valves at 326. When the turnable sleeve is in the default position, fluidic coupling between the combustion chamber and exhaust duct and/or intake duct via the spark plug through hole is blocked, and fluidic communication between the combustion chamber and intake duct or exhaust duct is only established when an intake valve or exhaust valve is actuated open. Further, when operating with an active deactivatable cylinder, spark is activated to ignite the fuel-air mix in the combustion chamber. Method 300 then returns.

Thus, as described above, during cylinder deactivation the turnable sleeve is rotated to provide a path for fluidic communication between the intake port/duct and the exhaust port/duct even when one or both of the intake and exhaust valves are closed. In doing so, gas exchange losses while operating with a deactivated cylinder and with actuated valves may be reduced. While the gas flow duct, throttle flap, and turnable sleeve described herein provide the ability to reduce gas exchange losses while operating with intake and exhaust valves that are still actuated during cylinder deactivation, in some examples the valve drive system may be permanently active while in other examples the valve drive system may be capable of being deactivated during cylinder deactivation or at other times. Further, even when valve actuation is maintained during cylinder deactivation, the valve drive system may be configured to adjust intake and/or exhaust valve timing during the cylinder deactivation or at other times.

Figure 8:
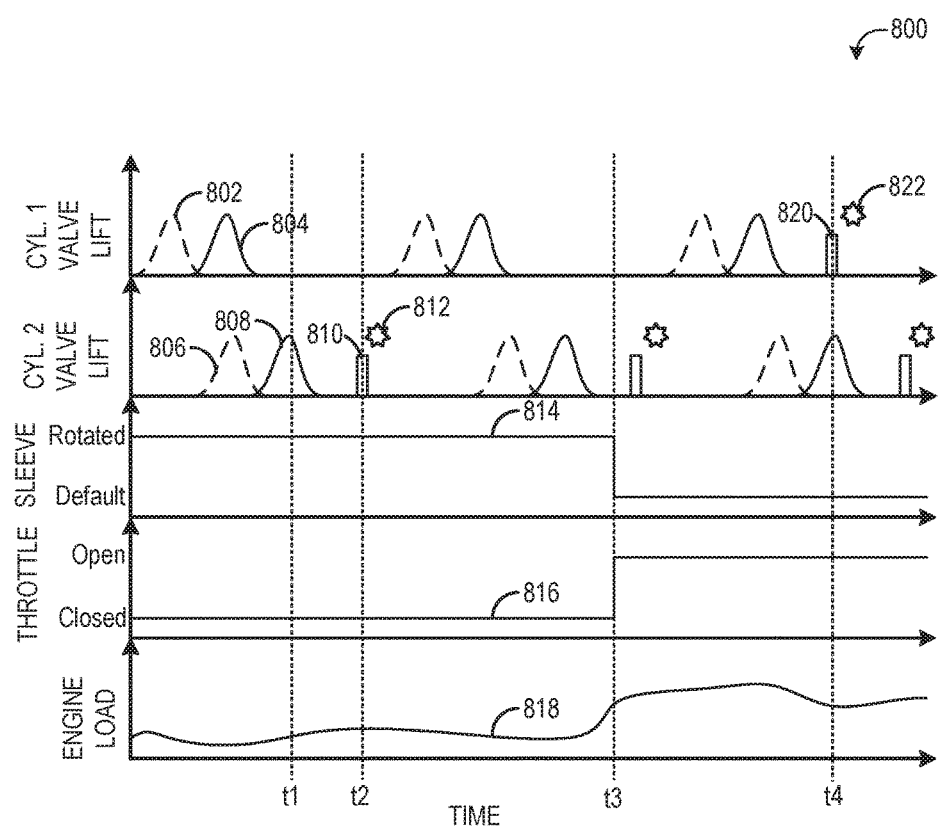
FIG. 8 is a timeline showing plots of interest during cylinder deactivation and reactivation.

FIG. 8 is a timeline 800 illustrating various operating parameters during cylinder deactivation and subsequent activation in an engine including a deactivatable cylinder, such as a cylinder as illustrated in FIGS. 1-6. The operating parameters depicted in FIG. 8 may be observed during execution of the method of FIG. 7, described above. Timeline 800 depicts intake and exhaust valve lift for a first, deactivatable cylinder and a second, non-deactivatable cylinder, as well as fuel injection and spark ignition events for each cylinder. Timeline 800 also illustrates turnable sleeve position, intake duct throttle flap position, and engine load.

Time is plotted along the horizontal axis and values of each respective operating parameter are plotted along the vertical axis.

Prior to time t3, the engine is operating with the first cylinder deactivated, due to engine load, illustrated by curve 818, being below a threshold load. Accordingly, as shown by exhaust valve lift curve 802 and intake valve lift curve 804, both the intake and exhaust valves for the first cylinder are actuated (e.g., opened and closed). However, during the time in the cylinder cycle for the first cylinder where fuel injection would normally occur, indicated by time t1, no fuel injection takes place, and no ignition occurs. For the second cylinder, which is activated, during its corresponding cylinder cycle, following exhaust valve and intake valve actuation, illustrated by curves 806 and 808, respectively, fuel injection is performed at time t2, as indicated by injection event 810. Thereafter, spark ignition occurs, as indicated by ignition event 812, and the fuel-air mix in the second cylinder combusts.

During the period of cylinder deactivation (e.g., prior to time t3), the turnable sleeve that surrounds the spark plug of the deactivated first cylinder is in the rotated position, as indicated by curve 814. When in the rotated position, fluidic communication among the intake duct, combustion chamber, and exhaust duct via the gas flow duct in the cylinder head is provided. Additionally, the intake duct throttle flap positioned in the intake duct of the first cylinder is closed, as indicated by curve 816.

At time t3, engine load increases to a threshold load wherein requested torque cannot be maintained with only the activated cylinder, and thus the deactivated first cylinder is reactivated. Accordingly, the turnable sleeve is moved back to the default position where the fluidic communication among the intake duct, combustion chamber, and exhaust duct via the gas flow duct in the cylinder head is blocked. Further, the intake duct throttle flap is opened. During the subsequent cylinder cycle for the first cylinder, following actuation of the intake valve, fuel is injected, as indicated by fuel injection event 820, and spark ignition occurs, as indicated by ignition event 822, in order to combust the fuel-air mix in the first cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multitasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during cylinder deactivation,
closing a throttle flap of a deactivated cylinder of an engine;
maintaining actuation of each of an inlet valve and an outlet valve of the deactivated cylinder; and
actuating a rotatable sleeve of the deactivated cylinder to fluidly connect an outlet duct to an associated combustion chamber via a first gas flow duct even when the outlet valve is closed, the rotatable sleeve housing a spark plug.

2. The method as claimed in claim 1, wherein actuating the rotatable sleeve of the deactivated cylinder to fluidly connect the outlet duct to the associated combustion chamber via the first gas flow duct comprises actuating the rotatable sleeve of the deactivated cylinder to connect the first gas flow duct and a second gas flow duct to one another and to the associated combustion chamber and fluidly connect an inlet duct to the associated combustion chamber via the second gas flow duct even when the inlet valve is closed.

3. The method as claimed in claim 1, wherein the rotatable sleeve of the deactivated cylinder is actuated by being rotated through a predetermined angle about its longitudinal axis in a through hole of the deactivated cylinder.

4. The method as claimed in claim 1, further comprising:
during cylinder activation, opening the throttle flap of the deactivated cylinder;
maintaining actuation of each of the inlet valve and the outlet valve of the deactivated cylinder; and
actuating the rotatable sleeve of the deactivated cylinder to block the first gas flow duct from the associated combustion chamber.

5. The method as claimed in claim 1, wherein actuating the rotatable sleeve to fluidly connect the outlet duct to the associated combustion chamber via the first gas flow duct comprises rotating the rotatable sleeve from a default position to a rotated position.

6. The method as claimed in claim 5, wherein rotating the rotatable sleeve from the default position to the rotated position comprises rotating the rotatable sleeve from the default position where the rotatable sleeve blocks fluid communication between the first gas flow duct and the associated combustion chamber to the rotated position where a port of the rotatable sleeve aligns with the first gas flow duct, thereby fluidly connecting the outlet duct to the associated combustion chamber via the first gas flow duct.

7. The method as claimed in claim 4, further comprising, during cylinder deactivation, suspending spark ignition in the deactivated cylinder via the spark plug and, during cylinder activation, activating spark ignition in the previously-deactivated cylinder via the spark plug.

* * * * *